United States Patent
Prin et al.

(10) Patent No.: US 6,251,819 B1
(45) Date of Patent: Jun. 26, 2001

(54) SILICON CARBIDE FOAM WITH HIGH SPECIFIC SURFACE AREA AND IMPROVED MECHANICAL PROPERTIES

(75) Inventors: Marie Prin, Saint Cassien; Benoist Ollivier, Voiron, both of (FR)

(73) Assignee: Pechiney Recherche, Paris (FR)

( * ) Notice: Subject to any disclaimer, the term of this patent is extended or adjusted under 35 U.S.C. 154(b) by 0 days.

(21) Appl. No.: 09/446,135

(22) PCT Filed: Jul. 20, 1998

(86) PCT No.: PCT/FR98/01579

§ 371 Date: Feb. 15, 2000

§ 102(e) Date: Feb. 15, 2000

(87) PCT Pub. No.: WO99/04900

PCT Pub. Date: Feb. 4, 1999

(30) Foreign Application Priority Data

Jul. 25, 1997 (FR) ................................................ 97 09743

(51) Int. Cl.⁷ .................................................. B01J 27/224
(52) U.S. Cl. ............................... 502/178; 501/80; 501/81; 501/82; 501/83; 501/84; 501/85; 501/88; 502/177; 502/182; 502/200; 502/439; 502/527.14; 502/527.15; 502/527.24

(58) Field of Search .................................... 501/80, 81, 82, 501/83, 84, 85, 88; 502/177, 178, 182, 200, 527.14, 527.15, 527.24, 439

(56) References Cited

U.S. PATENT DOCUMENTS

| 4,777,152 | 10/1988 | Tsukada . | |
|---|---|---|---|
| 5,196,389 | 3/1993 | Dubots . | |
| 5,217,930 | * 6/1993 | Dubots | ................................... 501/88 |
| 5,429,780 | 7/1995 | Prin et al. . | |
| 5,449,654 | * 9/1995 | Prin et al. | ............................ 502/178 |
| 5,468,370 | 11/1995 | Ledoux et al. . | |
| 5,958,831 | * 9/1999 | Prin et al. | ........................ 502/527.15 |

FOREIGN PATENT DOCUMENTS

97/26988   7/1997   (WO) .

* cited by examiner

*Primary Examiner*—Elizabeth D. Wood
(74) *Attorney, Agent, or Firm*—Dennison, Scheiner, Schultz & Wakeman

(57) ABSTRACT

Silicon carbide foam useful as a catalyst support has a BET specific surface area of at least 5 m²/g, and a compression strength exceeding 0.2 MPa. The foam is prepared by impreganting an organic foam with a suspension of silicon in a resin containing a cross-linking agent, incompletely cross-linking the resin, carbonizing the foam and resin, and carburizing the silicon.

20 Claims, No Drawings

SILICON CARBIDE FOAM WITH HIGH SPECIFIC SURFACE AREA AND IMPROVED MECHANICAL PROPERTIES

FIELD OF THE INVENTION

The invention relates to a silicon carbide foam with high specific surface area and high porosity, and improved mechanical properties (particularly compression strength), this foam being used mainly as a catalyst support, for example in the chemical or petrochemical industry and in exhaust silencers for internal combustion motors, or filters.

It also relates to its manufacturing process and its applications.

DESCRIPTION OF RELATED ART

Patent FR 2657603 describes how to obtain catalyst supports, particularly made of SiC, with a high specific area (greater than 15 $m^2/g$) with a dual mode porosity in which a first pore family with an average diameter of between 1 and 100 $\mu$m enables a gas to access a second pore family with average diameters smaller than 0.1 $\mu$m responsible for the specific area and the catalytic activity.

This support is obtained by mixing an Si powder or one of its reducible compounds in a polymeric or polymerizable organic resin, possibly with additives, forming of the mixture, cross-linking and polymerization of the resin, obtaining a porous carbon skeleton containing Si or a compound of Si, by carbonation in a non-oxidizing atmosphere at a temperature of between 500 and 1000° C., and finally carbonation of Si at a temperature of between 1000 and 1400° C., still under a non-oxidizing atmosphere.

This type of support has good compression strength and a fairly high density, usually of the order of 0.6 to 0.8 $g/cm^3$, but it looks more like a solid porous body rather than having the normally aerated appearance of a foam; consequently, its permeability is not sufficient to process large volumes of gas per unit weight of support, and its range of applications is limited. In other words, if the dimensions of the support are large it becomes difficult for treated gasses to reach its center which is consequently unused dead mass.

Patent FR 2684092 describes an SiC foam obtained by a carburization reaction starting from a volatile compound of Si with an activated carbon foam. This activated carbon foam may result from a polyurethane foam reinforced by impregnation using a resin, setting up the resin, carbonation and activation.

The carbide foam obtained has a specific area of not less than 20 $m^2/g$ due to macrbpores containing edges with lengths varying from 50 to 500 $\mu$m, and mainly mesopores for which the diameter is usually between 0.03 and 0.05 $\mu$m, which is generally about three times larger than the diameter of the pores in the activated carbon foam.

Its density is between 0.03 and 0.1 $g/cm^3$, however its relatively modest mechanical strength (the compression strength does not exceed about 0.02 MPa) may limit its field of use or may necessitate specific treatments to strengthen it if necessary.

Patent FR 2705340 describes a process for making a silicon carbide foam that consists of starting from a polyurethane foam, impregnating it with a silicon suspension in an oxygenated organic resin (usually furfurylic), polymerizing the resin up to 250° C. at a rate of 5° C./min., simultaneously carbonizing the foam and the resin between 250 and 1000° C. under an inert atmosphere, carbonizing the Si contained in the resulting carbon foam up to a temperature of between 1300 and 1600° C., and maintaining this temperature for 2 h under an inert atmosphere and cooling the carbide obtained.

The carbide foam obtained has a specific area of not less than 5 $m^2/g$, which in particular depends on the maximum temperature reached. It has a two mode porosity comprising macropores with an average diameter of between 100 and 150 $\mu$m and mesopores between 0.0275 and 0.035 $\mu$m.

This foam may be used as a catalyst support or as a diesel engine filter.

It gives satisfactory results in catalytic reactions. However as before, its compression strength and its resistance to abrasion are insufficient when severe thermal and/or mechanical loads are applied to it, particularly for use in exhaust silencers.

Thus the petitioner has attempted to make the use of the said SiC foam supports more reliable, particularly in exhaust silencers or for regeneration treatment, by significantly improving their mechanical properties without penalizing their catalytic properties, particularly their specific area or dual mode porosity (which is not easy since usually one is obtained at the detriment of the other) while maintaining their permeability.

Therefore, the petitioner attempted to improve the foam skeleton.

SUMMARY OF THE INVENTION

The invention is a foam based on silicon carbide for catalytic applications with a high specific area (its BET area is typically at least 5 $m^2/g$), characterized in that it has a compression strength higher than 0.2 MPa (2 bars), but generally at least 0.4 MPa (4 bars).

DETAILED DESCRIPTION OF THE INVENTION

The foam according to the invention usually has a bimodal porosity, measured with mercury, comprising essentially a family of pores with an average diameter of between 10 and 200 $\mu$m enabling easy access of the gasses to be processed towards mesoporosity in which the average diameter of the pores is between 0.005 and 1 $\mu$m, and which enables the catalytic activity.

This bimodal porosity is additional to the porous structure of the foam which is typically in the form of a network that could be qualified as "fibrous" comprising sorts of communicating cages delimited by carbide edges (or bridges) usually with a thickness of between 50 and 500 $\mu$m, connected to each other by nodes. The megapores of this network, visible to the naked eye, have dimensions that may be between 0.4 and 1.6 mm and correspond to a porous volume of about 3 to 12 $cm^3/g$. Consequently, its non darcian permeability to air is at least $10^{-5}$ m at 20° C. This permeability measures the ease with which gasses to be catalytically treated can pass through it.

It is remarkable to note that the specific area of the foam usually exceeds 10 $m^2/g$.

Its density is typically between 0.06 and 0.2 and preferably between 0.08 and 0.15.

It is beneficially in the form of a monolithic part, but it may also be used in particular form, in other words as stacked pieces of foam.

The compression strength is measured by a hardness test, well known in the strength of materials field. It consists of applying a force to a cylindrical punch with a known plane section and measuring the force necessary to make it penetrate into the foam by a distance of 1 cm, the sample having at least two plane parallel surfaces at a separating distance of at least 5 cm.

The foam according to the invention also has very good resistance to thermal shocks.

Thus, it resists at least one thermal shock consisting of increasing it to at least 800° C. and then suddenly cooling it in air to ambient temperature, without reducing the compression strength.

But it is even more remarkable to note that it resists a succession of several thermal shock cycles, each cycle including heating to high temperature followed by sudden cooling in air. For example, it was subjected to a sequence of heating and cooling cycles carried out at temperatures varying from 800° C. to 950° C. at 25° C. intervals, two cycles being carried out at each temperature, without noting any significant reduction in its compression strength.

Sudden cooling in thermal shocks takes place at an average rate of about 60° C./min.

The SiC content of the foam is typically greater than 95%, or better 98%, the residual Si content generally not exceeding 0.1%. The residual C content does not exceed 3%, and normally does not exceed 2%; the residual C content can be eliminated by oxidation in air at a temperature of about 600° C. to 850° C.

This foam is obtained by impregnating an initial organic foam, usually polyurethane, using a suspension of a silicon powder in a resin; this resin contains oxygen with a carbon yield exceeding 30%, and a cross-linking catalyst is added to it in the proportion of 1 to 10% (by weight), and preferably 5%; it is usually furfurylic resin and the cross-linking agent is hexamethylenetetramine, the proportion of silicon to resin by weight being between 0.6 and 1.2. The ratio of the total mass of impregnated foam to the initial foam mass is greater than 10 and less than 20, which usually corresponds to a ratio of the weight of resin to the weight of foam greater than 5 but not more than 11 to avoid the risk of blocking the porous structure of the foam. The impregnated foam is thermally treated until the resin is incompletely cross-linked when the organic foam is deteriorated, and the organic foam and the resin are then carbonized by increasing the temperature to 1200° C. under an inert atmosphere; the silicon is carbonized, still under an inert atmosphere, by increasing the temperature to between 1200° C. and 1370° C. to obtain a carbide foam with a high specific area, or to a higher temperature when obtaining a very high specific area is less critical, for example when the carbide foam is used as a filter in a diesel engine.

As already mentioned, the initial organic foam is usually a shaped part. Beneficially, it may comprise a doping element that improves the resistance of the SiC foam to oxidation at high temperatures, for example a powder of at least one easily oxidizable metal such as Al, Ca, Y, etc. or an alloy containing these metals, this doping element being introduced into the foam mass, for example during its manufacture. Furthermore, it is unexpectedly observed that addition of these doping agents usually improves the mechanical properties of the final carbide foam, particularly its compression strength.

If necessary, the permeability of the said organic foam can be improved by preliminary treatment, for example with soda in the case of polyurethane.

Instead of starting from an organic foam (usually polymeric and possibly doped), the invention also includes the possibility of starting from components used to make foam (for example monomer or copolymerizable agents, porogenic additives, hardeners, cross-linking or other agents) to which the said doping agent may be added, and optionally adds the silicon suspension in the resin to this mixture. This mixture may then be formed by molding, injection, etc. before obtaining the foam and being heat treated.

The Si suspension in an organic resin may contain several additives; solvent (for example alcohol) with filler (for example carbon black) to adjust the viscosity, plastifying agent, surface tension agent, etc. In this case, a heating step may be carried out at a moderate temperature to eliminate solvents, keeping the temperatures within the thermal conditions mentioned above.

The grain size of the silicon powder usually passes the 50 $\mu$m sieve, and preferably has an average particle diameter of less than 10 $\mu$m; it may be introduced in the form of an alloy comprising the said doping elements in order to improve the resistance of the SiC foam to oxidation; these doping agents may also be added in the form of a metallic powder or in the form of a decomposable salt mixed with the said Si powder. The proportion of the doping elements typically does not exceed 10% of the silicon added into the resin.

The polymerized resin typically contains not less than 5% by weight of oxygen, and preferably 15%.

It is essential to perform incomplete cross-linking of the resin before the organic foam deteriorates. The remaining plasticity accommodates any dimensional variations, deformations and stresses that occur during transformation of the said carbon foam during subsequent heat treatments. Thus, the risks of defects in the foam skeleton, resulting in the presence of voids in bridges, bridge bonding faults, etc., are significantly reduced and improve the mechanical properties. Similarly, the lack of constraints makes a significant contribution to improving the strength of the carbide foam, and particularly its resistance to thermal shock.

The incomplete polymerization ratio may be characterized by measuring the vitreous transition temperature (Tg) of the partially polymerized resin. In general this temperature is less than 110° C. and corresponds to the appropriate degree of polymerization when starting carbonation; and it is greater than 70° C., otherwise the shaped parts will not have sufficient resistance during the heat treatment.

The controlled polymerization heat treatment may be carried out in different ways; it is usually adapted to the size of the treated parts.

For example, the part could be heated by oven heating at a temperature of less than 225° C., typically between 150 and 225° C. and preferably about 200° C., for a period of between 10 and 90 minutes (preferably between 60 and 90 minutes) and then possibly cooled before continuing the heat treatment. It is also possible to work more quickly at a higher temperature, by putting the part in an oven preheated to a temperature exceeding the temperature at which the organic foam is degraded, for example 300° C., and limiting the residence time in the oven so that degradation of the said organic foam takes place before complete polymerization of the resin.

The polymerized resin typically contains at least 5% (by weight) of oxygen, and preferably 15%.

Note also that in combination with the controlled polymerization heat treatment, the high proportion of resin and therefore the impregnation suspension added to the organic foam contributes to increase the mechanical properties, and particularly the compression strength, without affecting the specific surface area which characterizes the catalytic properties of the carbide foam.

This type of carbide foam with a good compression strength could be used as a catalyst support in divided form of stacked pieces; but it is particularly suitable for use in monolithic form, for example in exhaust silencers; all that is necessary is to cover it with a deposit of the required catalyst, using conventional processes.

These mechanical properties of the foam according to the invention also make it particularly suitable for treatment after use in order to recover the deposit of catalyst covering it using simple hydrometallurgical processes and/or in order to recycle it.

The process may also be complemented by a stabilization heat treatment step in an oxidizing atmosphere, in order to improve the resistance of the silicon carbide foam to oxidation. This treatment may be done during elimination of the residual carbon; it is particularly beneficial to do this when the foam contains a doping element. It is typically carried out at between 850 and 1200° C. for a period of between 5 minutes and 24 hours, or preferably between 950 and 1100° C. for between 15 minutes and 10 hours, the duration being longer when the temperature is lower. It results in the foam being coated with an oxide film containing oxides of at least silicon or the doping elements, silicon oxide usually containing oxides of doping elements.

In order to give good resistance to oxidation, it is also possible to impregnate foam (for example under vacuum) using a solution of a decomposable salt of at least one of the said doping agents, applying a heat treatment to decompose the salt, and it is then advantageous to finish the treatment by applying the previous stabilizing treatment to obtain the corresponding protective film.

The following examples illustrate this invention.

EXAMPLE 1

This example concerns a silicon carbide foam obtained according to a process based on the state of the art.

This process is of the type described in patent FR 2705340.

A cylindrical piece of polyurethane foam with a diameter of 14 cm and height of 8 cm with a density of 0.028 was impregnated using a suspension containing Si powder with an average grain diameter of 5 $\mu$m in 95% furfurylic alcohol and 5% hexamethylenetetramine acting as a polycondensation catalyst.

The ratio of the silicon mass to the resin mass is 0.7.

After impregnation of the polyurethane foam by the suspension, the ratio of the weight of resin to the weight of the said foam is 4.1 and the ratio of the total mass of impregnated foam to the mass of polyurethane is 7.8.

Polymerization took place by increasing the temperature up to 250° C. at a rate of 5° C./min. for 45 minutes and holding the temperature constant at 250° C. for 5 minutes in order to polymerize the resin.

The vitreous transition temperature (Tg) of this resin under these conditions is 118° C.

Carbonation was then done by increasing the temperature from 250° C. to 1000° C. under an Ar atmosphere at a rate of 1° C./min.

The heat treatment continued by increasing the temperature up to 1350° C. at a rate of 3° C./min. with a constant temperature of 2 h at 1350° C., always under an inert atmosphere.

The resulting carbide foam was then treated in air at 800° C. to destroy the residual carbon.

The BET specific area is then 10.8 $m^2$/g and the compression strength measured by the hardness test is 0.08 MPa.

EXAMPLE 2

This example illustrates the invention.

The starting point was a piece of polyurethane foam identical to that in example 1.

The foam impregnation suspension was made using a silicon powder with an average grain diameter of 5 $\mu$m, in furfurylic alcohol with 5% of cross-linking catalyst (hexamethylenetetramine).

The ratio of the mass of Si to the mass of resin is 0.7.

However, the ratio of the mass of impregnated foam to the mass of polyurethane is 16.

Incomplete polymerization was done by over drying, increasing the impregnated foam temperature to 200° C. with a rate of temperature rise equal to 5° C./min.

The time did not exceed 35 minutes.

The value of Tg is 103° C.

The hardened product was then placed in a furnace under an Ar atmosphere in which the temperature was increased to 1200° C. at a rate of 3° C./min., to perform carbonation.

The heat treatment was continued by increasing the temperature up to 1350° C. under the same conditions, with the final temperature being held constant for 2 h to carbonize the silicon.

The shaped part of Si carbide foam has a BET specific area of 11.2 $m^2$/g and a compression strength of 0.6 MPa, which makes it particularly suitable for being impregnated by a catalyst for use in an exhaust silencer.

EXAMPLE 3

This example illustrates how to obtain a carbide foam with a doping agent according to the invention.

The initial polyurethane foam is impregnated using the same suspension as in example 2, containing Si in furfurylic alcohol with a cross-linking catalyst; however, monohydrated aluminum nitrate was added in a quantity sufficient to give 0.75% (by weight) of Al as a percentage of the final weight of SiC.

Heat treatments are the same as in example 2.

The SiC foam obtained has a specific area of 11.7 $m^2$/g, which is of the same order of magnitude as that in example 2; however, the compression strength of 0.9 MPa is significantly higher.

The SiC foam part was separated into two pieces. One of them was subjected to a stabilization treatment at 1000° C. for 2 hours in air; however, the two were then submitted to an oxidation resistance test by exposure to air at 1100° C. for 5 hours.

The weight increase of the unstabilized part was 9.3%, whereas for the stabilized part it was 1.6%.

For comparison, the same undoped foam (example 2) had a weight increase of 15.8% under the same conditions when it was not stabilized, and 6.7% when it was stabilized.

What is claimed is:

1. Silicon carbide foam for catalytic applications with a BET specific surface area of at least 5 $m^2$/g, and having a compression strength exceeding 0.2 MPa.

2. Foam according to claim 1, wherein the BET specific surface area is at least 10 $m^2$/g.

3. Foam according to of claim 1, having a bimodal porosity additional to the porous structure of the foam, comprising a first family of macropores with an average diameter of between 10 and 200 μm and a second family of mesopores with an average diameter of between 0.005 and 1 μm.

4. Foam according to claim 1, wherein the compression strength is maintained after being subjected to a thermal shock at not less than 800° C.

5. Foam according to claim 1, additionally comprising at least one doping element.

6. Foam according to claim 5, wherein the at least one doping element is an oxidizable metal.

7. Foam according to claim 6, wherein the oxidizable metal is Al, Ca or Y.

8. Foam according to claim 1, additionally comprising a coating with an oxide layer to improve resistance to oxidation of the foam.

9. Foam according to claim 8, wherein the oxide layer comprises at least silicon oxide or a doping element oxide.

10. Process for making a silicon carbide foam for catalytic applications with a BET specific surface area of at least 5 $m^2/g$, and having a compression strength exceeding 0.2 MPa, comprising the steps of:

impregnating an organic foam of predetermined permeability with a silicon powder suspension in a polymerizable resin containing a cross-linking catalyst, the resin containing oxygen and having a carbon yield of at least 30%, with a weight ratio of impregnated foam to foam before impregnation being between 10 and 20, treating the impregnated foam to cause cross-linking followed by degradation, the resin being incompletely cross-linked when degradation begins, carbonizing the organic foam and the incompletely cross-linked resin simultaneously by heating to 1200° C. under an inert atmosphere, and carburizing the silicon by heating to at least 1370° C., thereby obtaining silicon carbide foam with a residual Si content of less than 0.1%.

11. Process according to claim 10, wherein the organic foam is a polyurethane foam.

12. Process according to claim 10, wherein the organic foam contains at least one doping element.

13. Process according to claim 10, wherein the incompletely cross-linked resin contains at least 5% oxygen by weight and a carbon yield of at least 30%.

14. Process according to claim 13, wherein the resin is a furfurylic resin.

15. Process according to claim 10, wherein the resin contains at least one doping agent.

16. Process according to claim 10, wherein incomplete cross-linking is performed such that the resin has a vitreous transition temperature of not more than 110° C. when carbonization begins.

17. Process according to claim 10, wherein the silicon powder has a size of less than 50 μm.

18. Process according to claim 10, wherein said silicon is added in the form of an alloy containing at least one doping element.

19. Process according to claim 10, additionally comprising a stabilization treatment step of heating the silicon carbide foam in an oxidizing atmosphere at a temperature of between 850 and 1200° C. for a period of between 5 minutes and 24 hours.

20. Process according to claim 19, wherein the stabilization treatment takes place at a temperature between 950 and 1100° C. for a period of 15 minutes to 10 hours.

* * * * *